United States Patent Office 2,938,758
Patented May 31, 1960

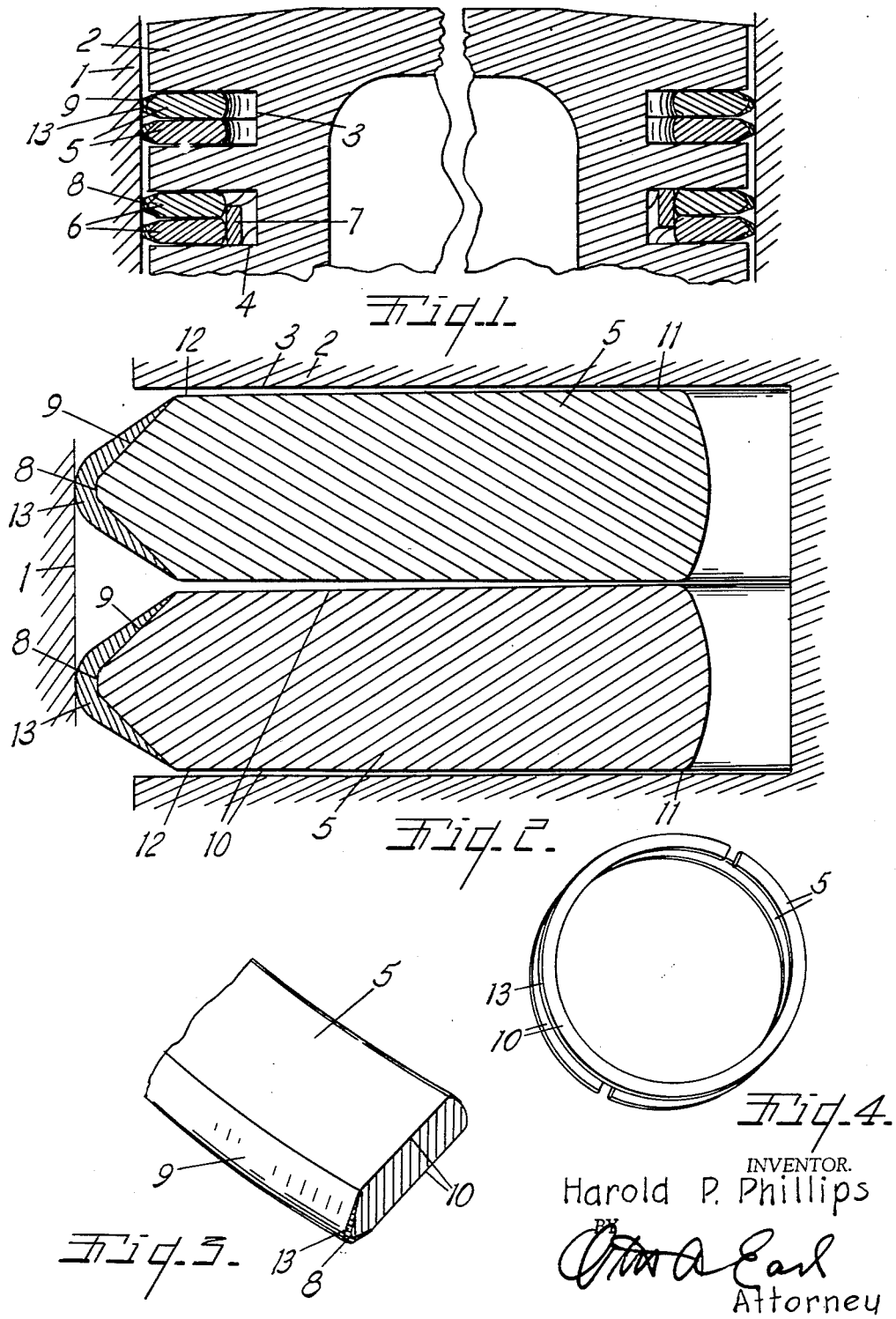

2,938,758

PISTON RING ASSEMBLY FOR INTERNAL COMBUSTION ENGINES

Harold P. Phillips, Hastings, Mich., assignor to Hastings Manufacturing Company, Hastings, Mich.

Filed Nov. 21, 1957, Ser. No. 697,920

4 Claims. (Cl. 309—44)

This invention relates to improvements in piston ring assemblies for internal combustion engines and one which is adapted for widely used four cycle type engines, also diesel and two cycle type engines.

This application is a continuation-in-part of my application for Letters Patent, Serial No. 529,651, filed August 22, 1955, now abandoned.

The main objects of this invention are:

First, to provide a piston ring assembly which is highly efficient in maintaining compression and also in minimizing fouling such as results from escape of lubricant into the combustion chamber.

Second, to provide a piston ring assembly which is well adapted and highly efficient for use in high speed internal combustion engines.

Third, to provide a piston ring assembly which is highly efficient over a long period of use.

Objects relating to details and economies of the invention will appear from the description to follow. The invention is defined and pointed out in the claims.

A preferred embodiment of the invention is illustrated in the accompanying drawing, in which:

Fig. 1 is a fragmentary longitudinal section of a piston ring assembly embodying my invention.

Fig. 2 is an enlarged fragmentary view further illustrating structural details.

Fig. 3 is a fragmentary perspective view of one of the ring elements.

Fig. 4 is a plan view of a pair of ring elements in slightly offset break joint relation.

In considering these drawings it should be understood they are not made to scale but Fig. 2 illustrates details of one commercial embodiment approximately to scale magnified approximately fifty times, the groove being .09375 of an inch in width and .160 of an inch deep. The ring element width or the axial thickness of the ring elements at the inner edge thereof is .045 of an inch to .0460 of an inch. The ring elements taper outwardly to a thickness approximately .0015 of an inch less than the inner, the chrome plate thickness illustrated is .005 of an inch.

It is desired to point out that in the present high compression engines piston rings are subjected to severe wear and that maintaining of compression and minimizing of fouling of the combustion chamber is highly important.

In the accompanying drawing 1 represents a cylinder, 2 a piston having piston ring grooves 3 and 4 therein. The groove 3 is commonly designated as a compression ring groove and the groove 4 is commonly designated as a scraper ring groove. The oil ring groove and ring assembly is not illustrated. The grooves 3 and 4 are without drainage and are unvented.

A pair of piston ring elements 5 are arranged in the groove 3 and a pair of piston ring elements 6 are arranged in the groove 4. These ring elements are substantially the same except that the ring elements 6 are of less radial width than the width of the ring elements 5 and are provided with an expander 7. The ring elements 5 and 6 are formed of ribbon steel coiled edgewise and have relatively narrow cylinder wall engaging face portions 8 and substantially flat inwardly diverging sides 9 which merge into the cylinder wall engaging faces 8 and the flat sides 10 of the rings.

These flat sides converge outwardly, that is, the rings are thicker at the inner edges 11 of the sides than they are at the outer edge 12 of the sides. This results in the ring elements having more clearance at their outer edges than they have at their inner edges. This minimizes the frictional engagement of the rings with the groove walls and with each other so that they have very free radial expansion so that each maintains its contact with the cylinder wall which frequently has substantial taper and frequently is somewhat out of round, also to maintain effective contact even though the piston may have, and quite commonly does have, some tilting or lateral rocking movement as it reciprocates in the cylinder.

All the ring elements have chrome plating 13 on their peripheral faces and this plating extends onto the flat surfaces 9 and terminates in feathered edges spaced inwardly from the flat sides 10 of the ring, that is, the chrome desirably does not overlap the sides.

The thickness of the chrome at the crown or at the cylinder wall engaging zone or surface in the embodiment illustrated in Fig. 2 is of the order of .005 of an inch, however, the thickness may range from .002 of an inch to a thickness substantially exceeding .005 of an inch but chrome thickness on the peripheral surfaces from approximately at least .003 of an inch doubles the effective life of the ring.

It is desired to stress that this increase in the effective life of the ring assembly is only one desirable feature. The effectiveness of the assembly from the compression standpoint from beginning of use and for a long period of use is the most important result.

As stated, the ring elements in each groove have free radial movement relative to each other so that they follow a tapered cylinder wall and also to a substantial extent conform to an out of round cylinder maintaining effective compression seal contact therewith. Each ring element initially presents only a very narrow or hair-line contact with the cylinder wall so that relatively high unit pressure results and this is maintained through a long period of use. As stated, the slight outward converging of the sides of the ring elements minimizes friction and facilitates independent adjustment of the ring elements to the cylinder wall.

As a commercial example cylinders in which the compression groove is of 3/32 of an inch in width are extensively used. For such grooves the applicant recommends ring elements of a thickness of .045 of an inch plus or minus .0005 of an inch. This insures that the two ring elements have free radial movement in the groove and relative to each other. With the grooves of other widths the axial thickness of the ring element is varied accordingly. This general ratio provides clearance permitting independent expansion and contraction of the ring elements relative to each other without undesirable clearance for the assembly. The outward converging of the sides of the ring elements, as stated, minimizes frictional engagement with each other and with the walls of the groove and permits them to tilt slightly relative to each other and to conform to the cylinder contours.

The combination or assembly for a piston provided with first and second compression ring grooves, pairs of piston ring elements of the type described in each groove, the second pair being provided with an expander results in a highly satisfactory compression ring assembly. The unit pressure on the rings in the second groove substantially exceeds that of the unit pressure on the rings in the first groove but it is not practical to provide an expander spring in the first groove owing to heat conditions which destroy the temper of the expander so the ring assemblies in the first and second groove coact to provide very efficient compression assemblies.

I have illustrated and described my invention in a highly practical embodiment thereof. I have not attempted to illustrate or describe other adaptations or embodiments, for example, a particular piston ring structure as I believe this disclosure will enable those skilled in the art to embody or adapt my invention as may be desired.

Having thus described the invention what I claim as new and desire to secure by Letters Patent is:

1. In combination, a piston having a first compression ring groove adjacent its head end and a second ring groove spaced axially inwardly from but adjacent to said first compression ring groove, both grooves being without interior drainage, split radially expansible ring elements of substantially the same axial thickness formed of ribbon steel coiled edgewise disposed two in each of said ring grooves in side by side relation, the combined axial thickness of the two ring elements relative to the width of the groove in which they are disposed being such as to provide clearance permitting the ring elements to expand and contract independently of each other within the grooves and relative to the piston, said ring elements being without substantial dish and each having a relatively narrow central cylinder contacting land surface and substantially flat annular side surfaces disposed in inwardly diverging relation to the cylinder contacting land surface and to each other and of a width exceeding the width of the cylinder contacting land and merging into the same and into the sides of the ring elements which diverge inwardly to such degree that the clearance of the ring elements within the grooves increases outwardly from the inner edges of the ring elements, said ring elements having chrome plating of substantial thickness on the cylinder contacting land surfaces thereof lappingly extended upon said inwardly diverging surfaces thereof and terminating adjacent the inner edges of said inwardly diverging surfaces.

2. In combination, a piston having a first compression ring groove adjacent its head end and a second ring groove spaced axially inwardly from but adjacent to said first compression ring groove, both grooves being without interior drainage, split radially expansible ring elements of substantially the same axial thickness formed of ribbon steel coiled edgewise disposed two in each of said ring grooves in side by side relation, the combined axial thickness of the two ring elements relative to the width of the groove in which they are disposed being such as to provide clearance as permitting the ring elements to expand and contract independently of each other within the grooves and relative to the piston, said ring elements being without substantial dish and each having a relatively narrow transversely curved central cylinder engaging land surface and substantially flat annular side surfaces disposed in inwardly diverging relation to the cylinder land surface and to each other and of a width exceeding the width of the cylinder land surface and merging into the same and into the sides of the ring elements which diverge inwardly to such degree that the clearance of the ring elements within the grooves increases outwardly from the inner edges of the ring elements, said ring elements having chrome plating on the cylinder land surfaces thereof lappingly extended upon said inwardly diverging surfaces thereof and terminating adjacent the inner edges of said inwardly diverging surfaces, said cylinder land surfaces of said ring elements being of the order of .004 of an inch prior to chrome plating and of the order of .008 of an inch after chrome plating.

3. In combination, a piston having a ring groove therein, the groove having parallel side walls and being without interior drainage, a pair of split independently radially expansible ring elements of substantially the same axial thickness disposed in said groove in side by side relation, the combined axial thickness of the ring elements relative to the width of the groove being such as to provide clearance permitting the ring elements to expand and contract independently relative to each other within the groove and relative to the piston, the depth of the groove relative to the radial width of the ring elements being such that there is substantial clearance between the ring elements and the bottom of the groove in all use positions thereof, the outer peripheries of each of said ring elements having a relatively narrow central cylinder contacting land surface and substantially flat annular side surfaces disposed in inwardly diverging relation to the cylinder contacting land surface and to each other and merging into the cylinder contacting land surface of the same and into the sides thereof, the sides of the ring elements diverging inwardly to such degree that the clearance of the ring elements within the groove and relative to each other and the side walls of the groove increases outwardly from the inner edges of the ring elements, said ring elements having chrome plating of substantially the thickness on the cylinder land contacting surfaces thereof and lappingly extended upon the diverging surfaces thereof and terminating adjacent the inward edge of said inwardly diverging peripheral surfaces.

4. In combination, a piston having a ring groove therein having parallel side walls and being without interior drainage, a pair of split independently radially expansible ring elements of substantially the same axial thickness disposed within the groove in side by side relation, the combined axial thickness of the ring elements relative to the groove being such as to provide clearance permitting the ring elements to expand and contract within the groove independently and relative to each other and relative to the piston, the depth of the groove relative to the radial width of the ring elements being such that there is substantial clearance between the ring elements and bottom of the groove in all use positions thereof, the sides of the ring elements diverging inwardly to such degree that the clearance of the ring elements within the groove relative to each other and to the side walls of the groove increases outwardly from the inner edges of the ring elements so that the freedom of radial movement of the ring elements relative to each other and the parallel side walls of the groove increases with the outward movement of the ring elements within the groove.

References Cited in the file of this patent

UNITED STATES PATENTS

| | | |
|---|---|---|
| 2,068,114 | Solenberger | Jan. 18, 1937 |
| 2,554,289 | Anderson | May 22, 1951 |

FOREIGN PATENTS

| | | |
|---|---|---|
| 813,829 | France | June 9, 1937 |